INVENTOR
*NORBERT RUBIN*
BY *Richey & Watts*
ATTORNEYS

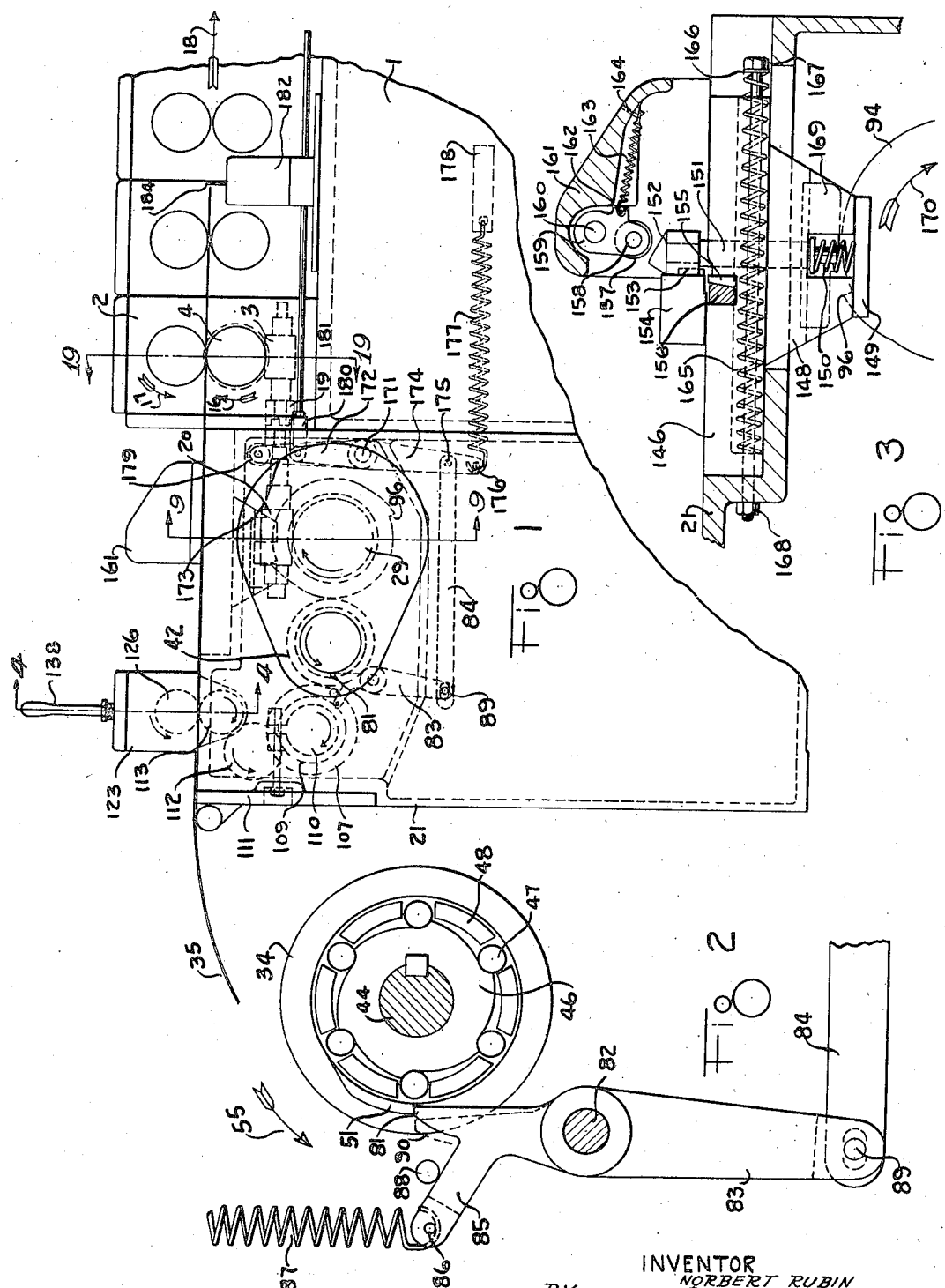

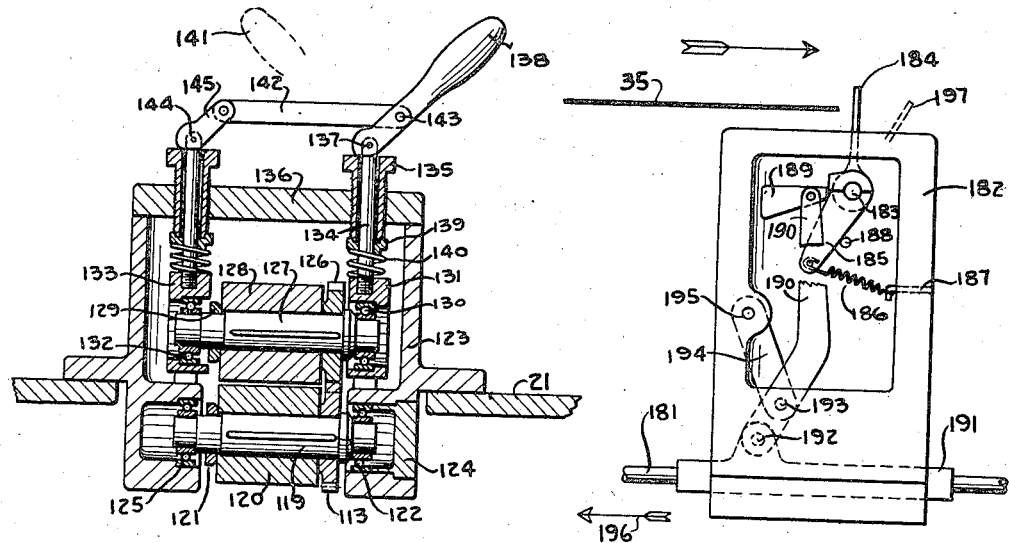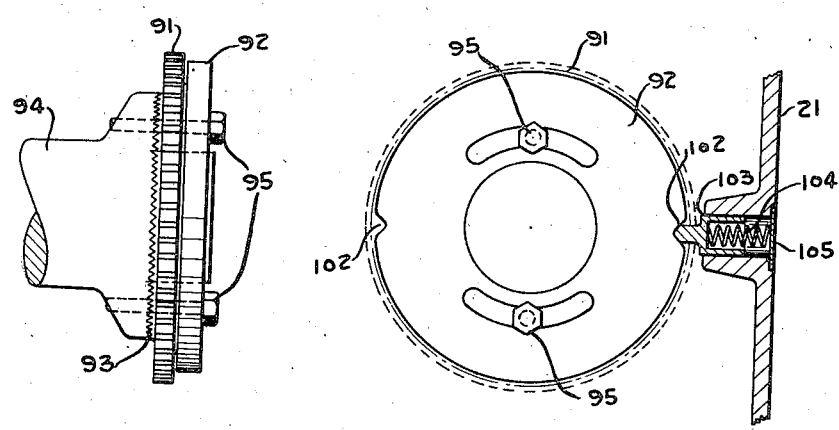

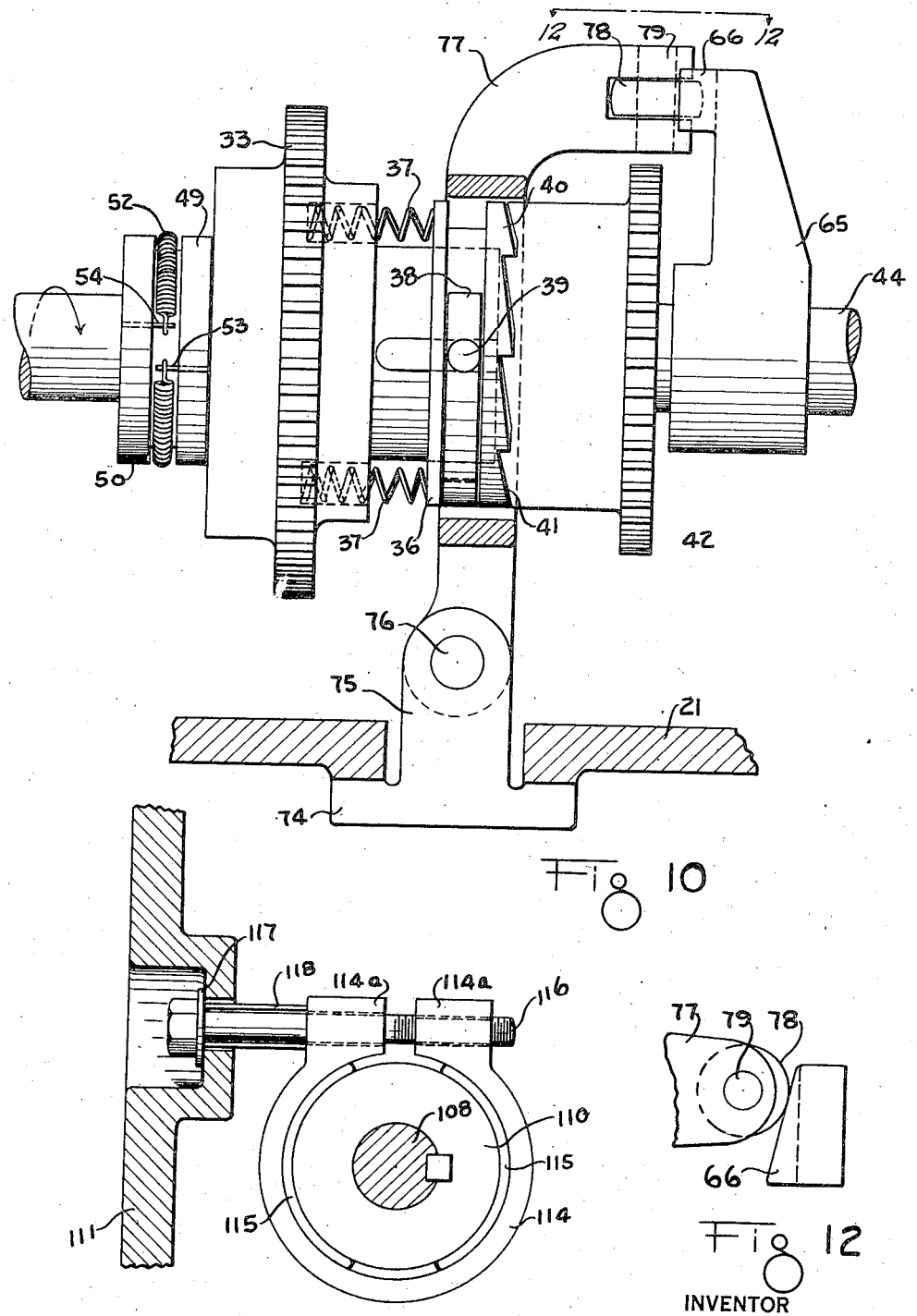

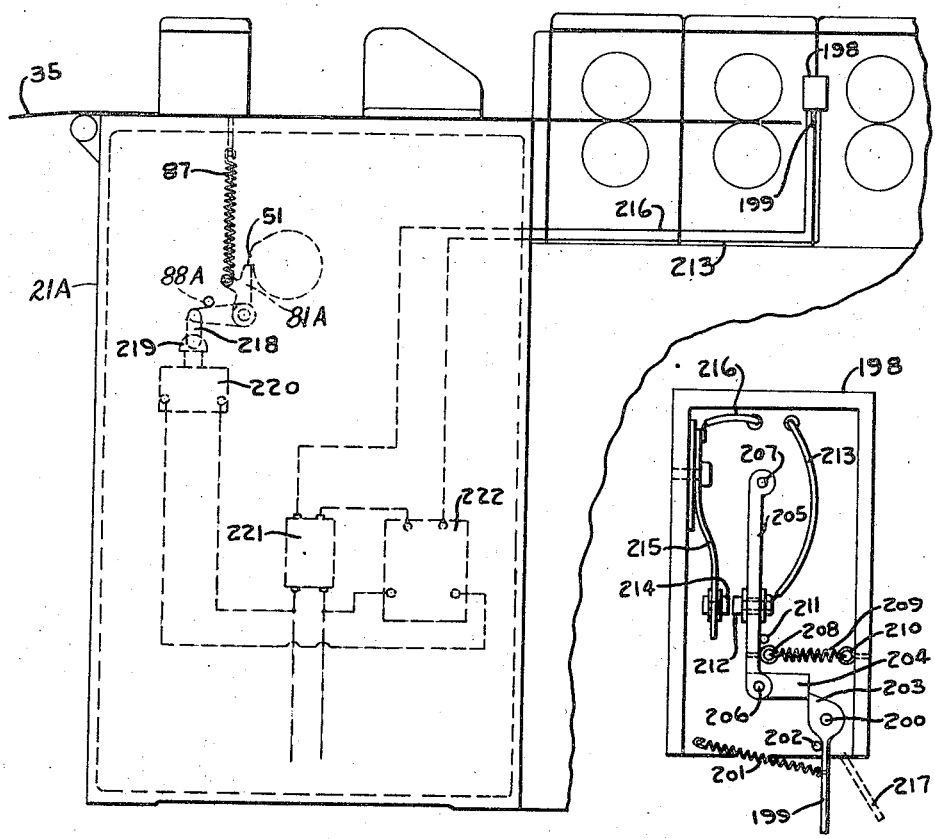
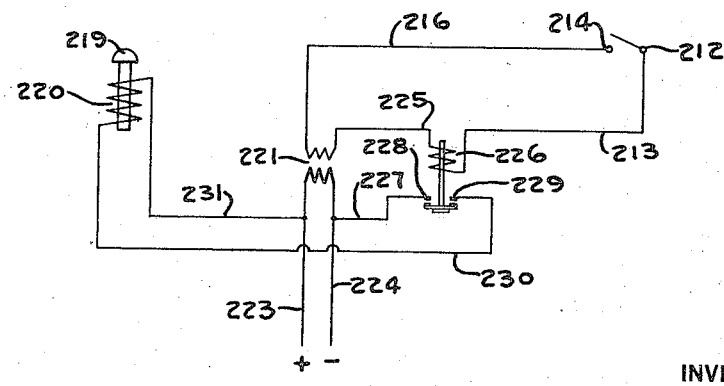

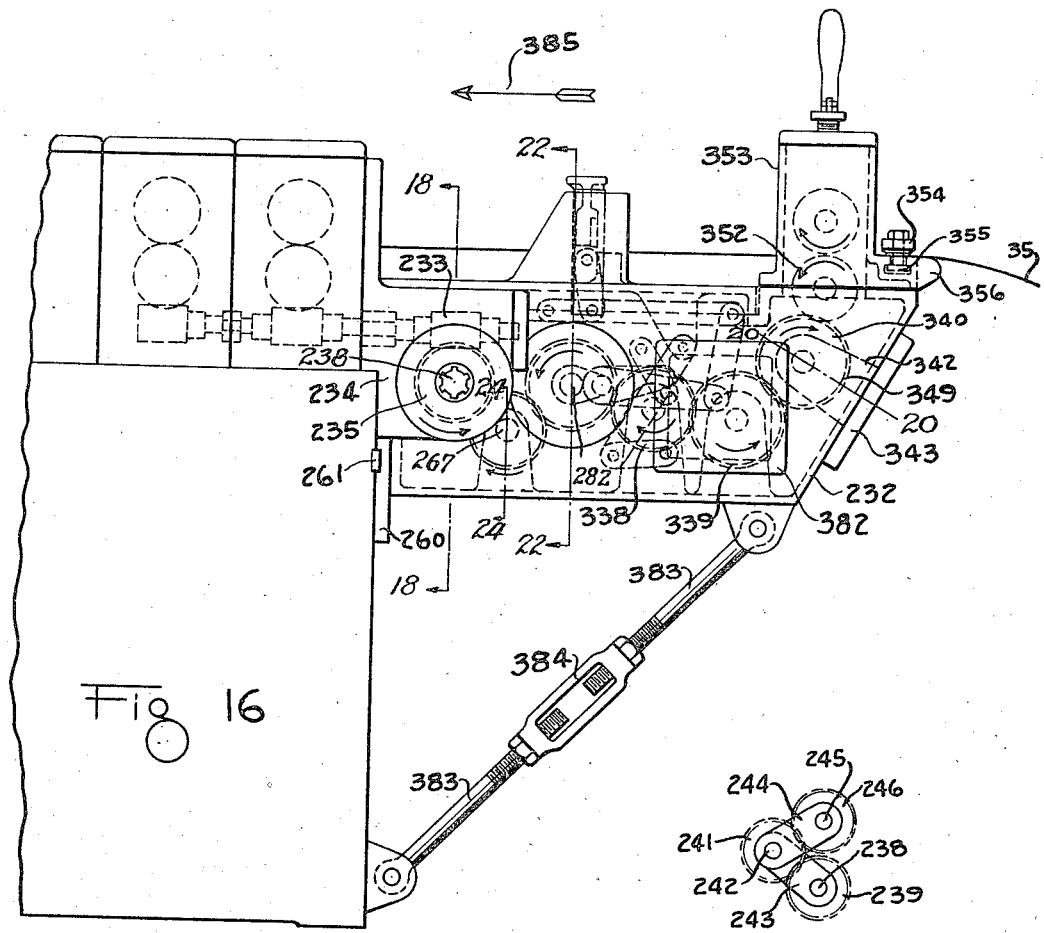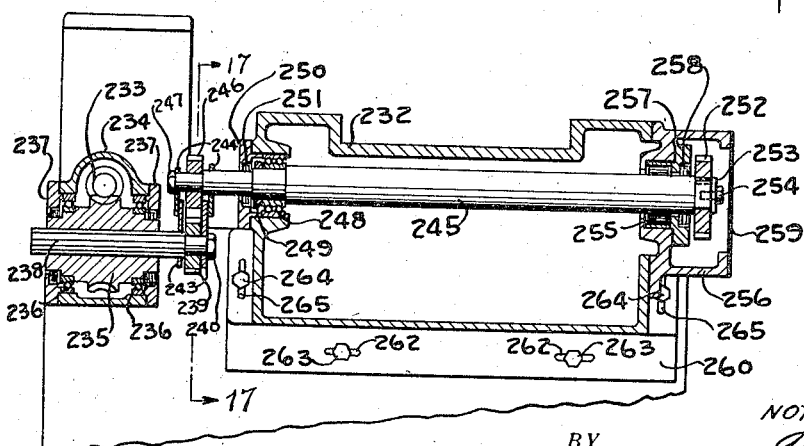

June 30, 1936.  N. RUBIN  2,045,928
STOCK CUTTING MECHANISM
Filed Nov. 11, 1932  9 Sheets-Sheet 7
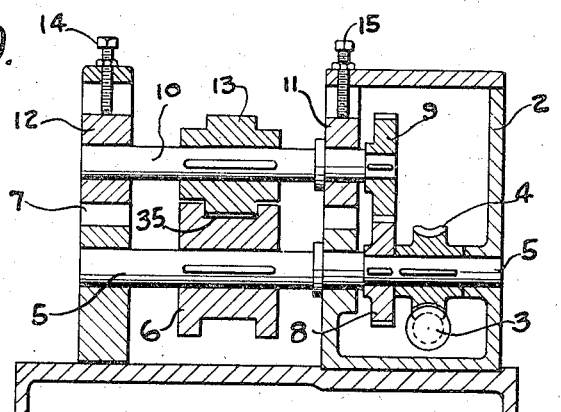
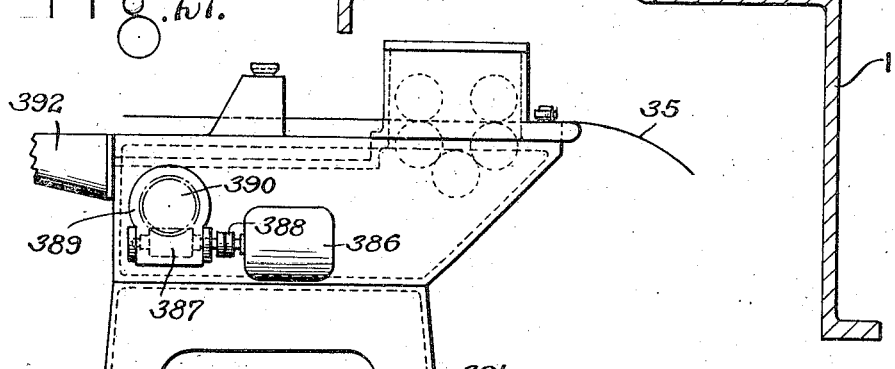
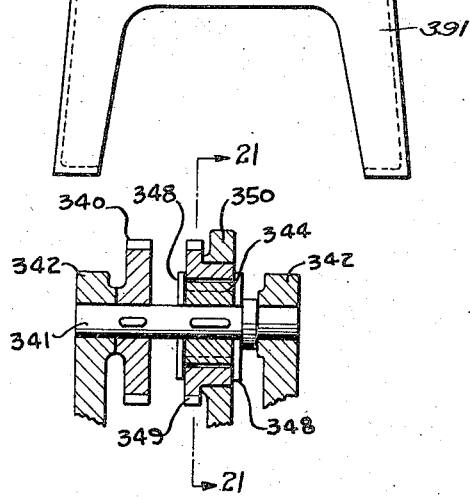
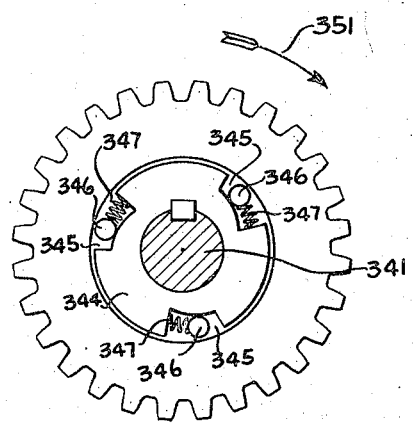
INVENTOR
NORBERT RUBIN
BY Richey & Watts
ATTORNEYS June 30, 1936.　　　　　N. RUBIN　　　　　2,045,928
STOCK CUTTING MECHANISM
Filed Nov. 11, 1932　　　9 Sheets-Sheet 8
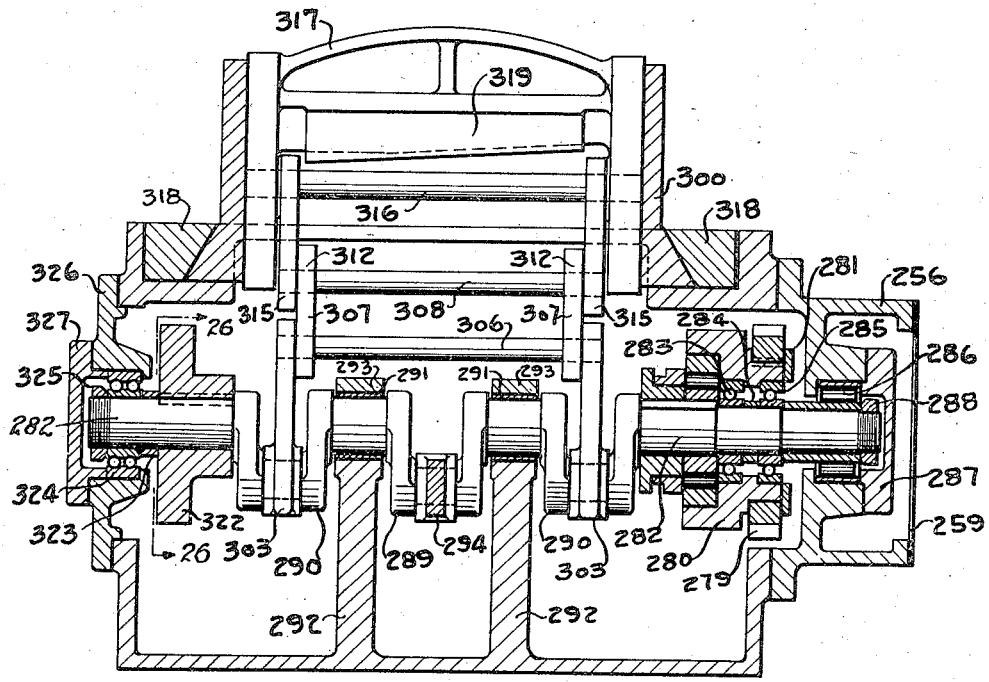
Fig. 22
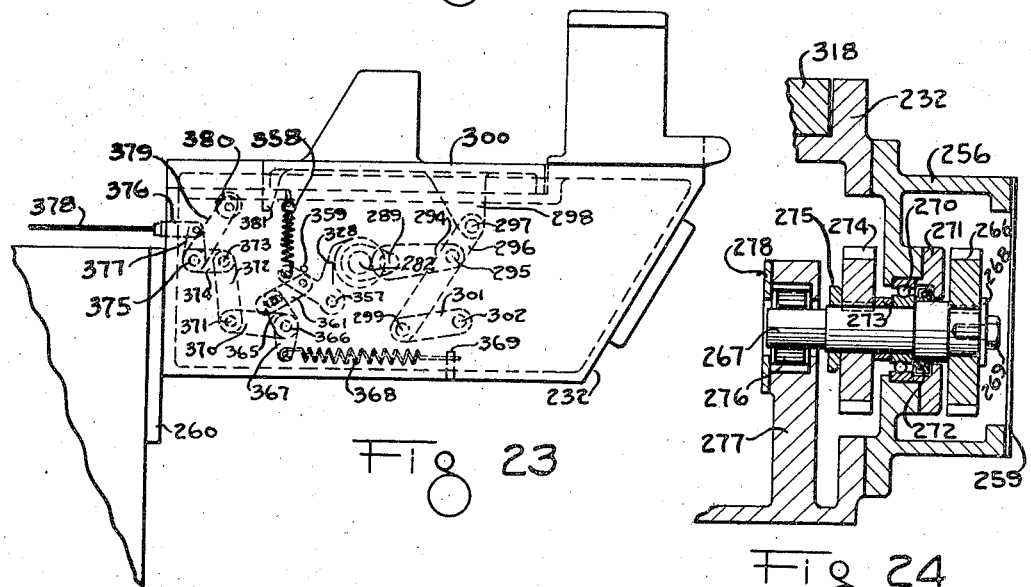
Fig. 23
Fig. 24
INVENTOR
NORBERT RUBIN
BY Richey & Watts
ATTORNEYS Patented June 30, 1936

2,045,928

UNITED STATES PATENT OFFICE 2,045,928

STOCK CUTTING MECHANISM

Norbert Rubin, Cleveland, Ohio, assignor to McKinney Tool & Manufacturing Company, Cleveland, Ohio, a corporation of Ohio Application November 11, 1932, Serial No. 642,229

8 Claims. (Cl. 164—49)

This invention relates to stock cutting mechanism and in particular to a shear operable to cut stock into given lengths preparatory to its insertion into a cold roll forming machine.

Usually when metal strip is fed through a rolling machine to be formed, a long section emerges from the delivery end of the machine, which is cut into given lengths. Occasionally, the stock is first cut into predetermined lengths and fed as such into the rolling machine. According to my invention, the stock, taken from a coil, is automatically cut into predetermined lengths and then automatically fed into the receiving end of the rolling machine. Thus, hand labor is largely eliminated in cutting and handling the stock, and production is accelerated. Such is one of the objects of this invention.

When automatically cutting off stock from a coil it is generally desirable to gauge the lengths to be cut from one of the cut ends. When the lengths are fed and cut continuously their ends substantially abut with each other. This makes it difficult to insert gauging fingers or control means between the cut ends. In my device, I have included gap forming means so that a gap is automatically formed between the cut ends for insertion of the control mechanism. This forms another object of my invention.

Another object is to provide a continuously operating source of power and a power pickup that operates uniformly and substantially instantly for operating the mechanism. It is evident that the starting impulse operative to start a cutting cycle must act uniformly and substantially without any variation in time lag to control accuracy in the length of cut. Reducing this time lag to a minimum and controlling its uniformity also eliminates a possible error in length caused by slipping of the stock through the feeding means between the actual start and completion of the cutting cycle.

When the mechanism of this invention is connected to a cold roll forming machine it is desirable to use the forward end of the piece being cut to trip the mechanism for a starting of the cutting cycle. At times this end may be between a pair of rolls in the machine at the instant contact is required. I have provided as another object of this invention, means to adjust this contact position so that it can be moved relative to the rolls to any desirable position.

Another object of the invention is to provide means for setting the cutting mechanism into operation by a slight force so as to be operable by light gauge stock without materially affecting the motion or the shape of the stock. A sensitive trigger mechanism to be engaged by the stock may be used to effect that result.

I have also shown this mechanism with an individual motor drive so that it may be operated as an independent unit. This arrangement will allow its being used to merely cut stock into any given lengths. Such extreme flexibility forms an important object of this invention.

Because of the extremely close tolerances that can be maintained in the lengths of the cut pieces a considerable saving of material will result therefrom. The elimination of the waste, such as would be experienced with rough and large tolerances, forms another object of my invention.

It is evident that the mechanism could be attached to the exit end of a rolling machine by having the shear blades shaped to suit the contour of the stock being formed in the machine. In this manner the stock could be produced in short lengths which could not be produced by first cutting the stock to lengths and then passing through the rolling machine because of the lateral spacing of rolls in the rolling machine. This advantageous combination of my mechanism with a rolling machine forms an important object of this disclosure.

Further objects and advantages of this mechanism will be apparent from the following detailed description. While the invention in its broader aspects is capable of embodiment in various forms, a preferred embodiment thereof, and of the mechanisms forming the same, is illustrated in the accompanying drawings, in which:—

Fig. 1 is an elevation of one form of the mechanism with a portion of a cold roll forming machine attached to the drive end, with portions removed.

Fig. 2 is a section illustrating the clutch of the driving mechanism.

Fig. 3 is a view of a portion of the driving mechanism with portions omitted and in section.

Fig. 4 is a section taken along line 4—4 with portions removed.

Fig. 5 is an elevational view of one type of trigger mechanism with portions omitted.

Fig. 6 is an elevational view of a portion of the drive mechanism showing a type of adjustment, with sections removed.

Fig. 7 is a side elevation of the mechanism shown in Fig. 6 with portions removed.

Fig. 10 is a portion of the mechanism shown in Fig. 8 with sections removed.

Fig. 11 is an elevation of the brake mechanism shown in Fig. 1.

Fig. 12 is a view taken along line 12—12, Fig. 10.

Fig. 13 is a view similar to Fig. 1 showing the mechanism with an electrical control, with portions omitted.

Fig. 14 is a plan view of one type of an electrical trigger.

Fig. 15 is a circuit diagram for use with the control shown in Fig. 13.

Fig. 16 is an elevation of another form of the mechanism with a portion of a rolling machine attached to the drive end with portions removed.

Fig. 17 is a section taken along line 17—17 Fig. 18, with portions removed.

Fig. 18 is a section taken along line 18—18 Fig. 16 with portions removed.

Fig. 19 is a section taken along line 19—19 Fig. 1 with portions removed and in section.

Fig. 20 is a section taken along line 20—20 Fig. 16 with portions removed.

Fig. 21 is a section taken along line 21—21 Fig. 20.

Fig. 22 is a section taken along line 22—22 Fig. 16 with portions removed and in section.

Fig. 23 is a view similar to Fig. 16 showing control mechanism and with portions removed.

Fig. 24 is a section taken along line 24—24 Fig. 16 with portions removed.

Fig. 27 is an elevation of another form of the mechanism showing a self-contained source of power.

Figure 8:
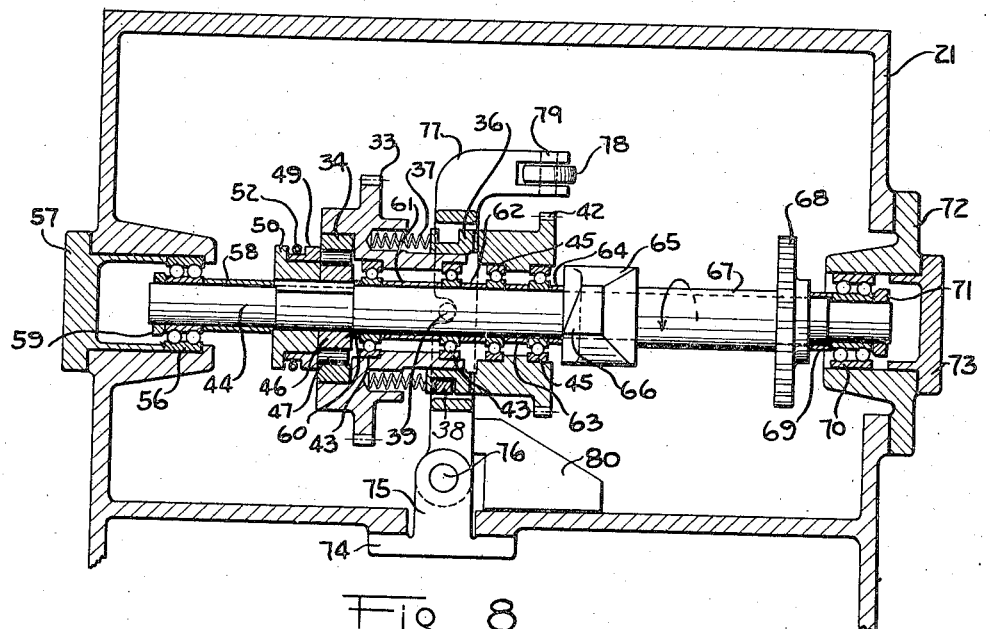
Fig. 8 is a section illustrating the drive mechanism.

Referring to the drawings. Mounted on one end of bed 1, Figs. 1 and 19, of a conventional type of cold roll forming machine is the mechanism comprising my present invention. Mounted for rotation in housing 2 is a worm 3 being meshed in driving relation with worm gear 4. A shaft 5, having worm gear 4 keyed thereon, is mounted for rotation in housing 2 and extends through and beyond the housing. Shaft 5 has a roll 6 mounted thereon. The shaft 5 is also journalled in an outboard housing 7. Shaft 5 carries spur gear 8, keyed thereon. Meshing with spur gear 8 is another spur gear 9 keyed to one end of a shaft 10. Adjacent to gear 9 is a journal 11, for shaft 10, slidably mounted in ways internal of housing 2. The opposite end of shaft 10 is mounted in journal 12 which is slidably mounted in ways internal of outboard housing 7. Intermediate the bearing boxes 11 and 12 and keyed to shaft 10 is a second roll 13. Mounted with threaded engagement in the tops of housings 2 and 7 and arranged to bear against bearing boxes 11 and 12 are set screws 14 and 15. It is evident that as screws 14 and 15 are turned down that the rolls 6 and 13 will be brought together and that as they are screwed out the rolls will be separated. It is also evident that when worm 3 is rotated shaft 5, roll 6 and spur gear 8 will receive rotation through the driven worm gear 4. The driven spur gear 9 will then also impart rotation to shaft 10 and roll 13. It is obvious that when roll 6 is driven in the direction of arrow 16, Fig. 1, and roll 13 in the direction of arrow 17 that stock 35 interposed between these two rolls will be driven in the direction of arrow 18.

The rolls 6 and 13 and their associated driving mechanism constitute the first pass in the rolling machine. It will be evident that for each succeeding pass a similar arrangement will be required. Keyed on and between the ends of each worm is a coupling so that a source of power being applied to any worm will be transmitted to any other worm. The continuation of this rolling machine and its component driving mechanism is not here shown or further described as it does not constitute a part of my invention and as it is also a mechanism familiar to all skilled in the art to which this invention pertains.

Figure 9:
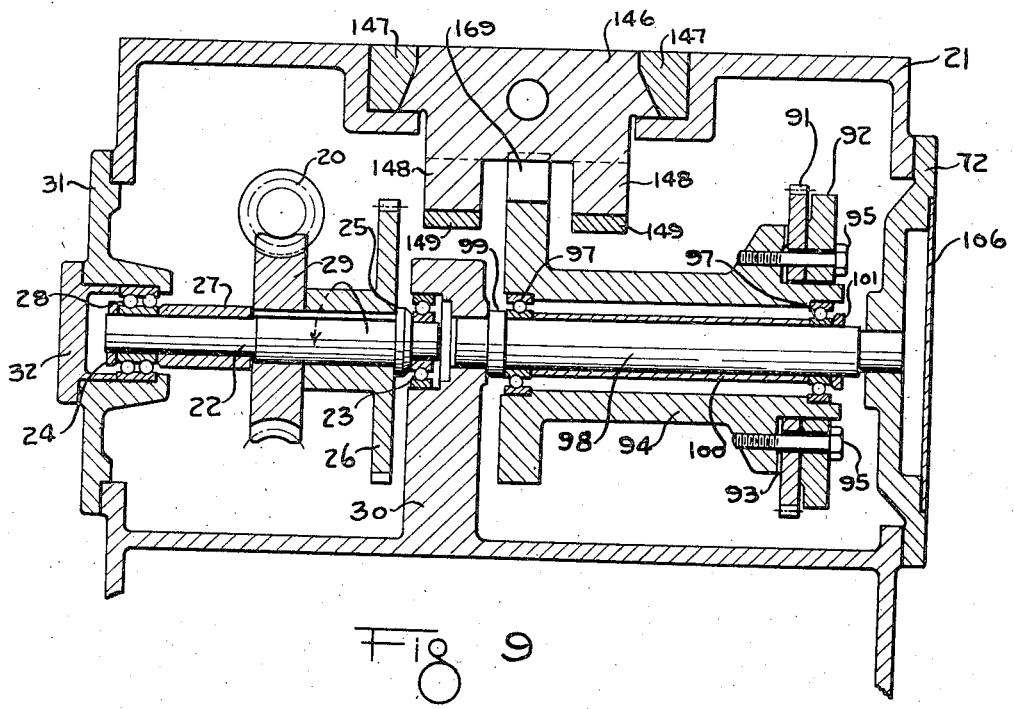
Fig. 9 is a section taken along line 9—9 of Figure 1 with portions removed and in section.

Keyed to the outer end of worm 3 is a coupling 19, its opposite end being keyed to another worm 20 which is suitably mounted for rotation in housing 21, (Fig. 9). Mounted in driven relation to worm 20 is a worm gear 29 (Fig. 9) which is keyed to a shaft 22 journalled at its extremities, as indicated at 23 and 24. Adjacent to one end of the shaft 22 a shoulder 25 is formed thereon having a spur gear 26 pressed against its face, which gear is keyed to the shaft 22. Intermediate of worm gear 29 and journal 24 is a spacer 27 to facilitate the correct location of worm gear 29. The outer end of shaft 22 is threaded to receive a standard lock nut 28 which is employed to lock bearing 24, spacer 27, worm gear 29, and spur gear 26 in their respective positions against shoulder 25. The outer race of bearing 23 is mounted in a hole bored in a lug 30 which is cast as a part of housing 21. The outer race of bearing 24 is mounted in a large cover plate 31 and retained therein by cap 32 which is fastened to the cover plate by screws, not shown. Cover plate 31 is fastened to housing 21 by screws, not shown, and is provided with a bore large enough to facilitate an easy assembly of shaft 22 and its component parts. It is evident that when worm 20 is rotated, worm gear 29, spur gear 26 and shaft 22 will also be rotated. The further purpose of this drive will be hereinafter more fully described.

Co-acting with gear 26 and receiving rotation therefrom is a spur gear 33, Fig. 8, having on its one side a hub and, mounted internally therein, a clutch driven ring 34. On the opposite side of gear 33 is another hub having splined thereon for reciprocal movement a collar 36, (Figs. 8 and 10). Abutting with the side of collar 36 adjacent to gear 33 are a series of compression springs 37 which seat in holes bored in gear 33, and tend to push the collar away from the gear. Around the periphery of the collar 36 is formed a recess into which is seated a yoke 38 having on its opposite sides and extending outwardly from the center a pair of trunnions 39. On the opposite side of collar 36 from the gear 33 are formed a series of ratchet teeth 40 which mesh in driving relation with a series of ratchet teeth 41 which are formed on the outer end of a hub on the side of spur gear 42. Mounted internally of gears 33 and 42 are bearings 43 and 45 which in turn are mounted on shaft 44 so that the gears are free to rotate relative to the shaft. Keyed to shaft 44 and carried thereon in driving relation to clutch ring 34 is a clutch cam 46 (Figs. 2—8—10) having on its periphery a series of engaging steps in which lay rollers 47. Extending between rollers 47 are a series of lugs 48 which are joined at their outward ends by medium of a ring 49 being mounted for rotation on clutch member 50. On the periphery of ring 49 is formed a tooth 51 alongside of which is formed a groove wherein is carried a tension spring 52. One end of spring 52 is fastened to a pin 53 carried in member 49 and the opposite end is fastened to a pin 54 carried in member 50 so the tendency would be to rotate member 49 in the direction of arrow 55, Fig. 2, the purpose of this motion being more fully hereinafter described. Bearing 56 Fig. 8 is mounted in a boss in housing 21, being retained therein by cap 57 fastened to the housing by screws, not shown, and carries in its inner race one end of shaft 44. Carried on shaft 44, between bearing 56 and clutch member 50, is a spacer 58 used as a medium to press clutch members 50 and 46 against a shoulder on shaft 44 by the use of lock nut 59 on the end of shaft 44. As a means of maintaining the correct positions of gears 33 and 42 on shaft 44 I have used a series of spacers 60—61—62—63 and 64 placed between the bearings 43 and 45, and around the shaft. Abutting with spacer 64 and keyed to the shaft is a member 65 having an extension radiating from its hub upon which is formed a cam surface 66. Spacer 67, one end of which abuts with member 65 and its other end bearing against a spur gear 68, is carried on shaft 44. Bearing against the opposite side of gear 68, which is keyed to shaft 44, is another spacer 69 having its opposite end abutting with the inner race of bearing 70. Bearing against the opposite face of bearing 70 and mounted on a threaded end of shaft 44 is a standard lock nut 71 which serves as a means of retention for all the members on the shaft from bearing 70 to spacer 60 inclusively. Bearing 70 is housed and supported in a cover plate 72 which is fastened to housing 21 by screws and dowels, not shown, and retained therein by a cap 73 which is fastened to the cover plate by screws, not shown. Sealing a hole in the bottom of housing 21 (Figs. 8 and 10) is a plate 74 fastened thereon by screws, not shown. Extending upwardly through said hole into the housing are a pair of lugs 75, attached at their lower ends to plate 74 and having their upper ends bored to serve as bearings for the ends of a pin 76. Mounted for rocking movement on pin 76 and between lugs 75 is a member 77 extending upward beyond shaft 44, there being an aperture, in the member 77, sufficiently large to clear the shaft and the assembly thereon, member 77 is provided with a clevised end having a roller 78 retained therein by a pin 79. Cam 66 coacts with roller 78. Formed exactly opposite each other within the aperture of member 77 are a pair of grooves in which are seated the trunnions 39 which are a part of yoke 38. Fastened in the proper location to housing 21 by screws, not shown, is a stop block 80 which is employed to maintain a correct forward position of member 77. Mounted in interfering relation with tooth 51 on member 49 is a dog 81, Fig. 2, having its opposite end mounted for rocking movement on a pin 82 which has a fixed position in housing 21. Extending beyond pin 82 as a part of dog 81 is a lever 83 having its end clevised to receive one end of a link 84. Extending at an angle from dog 81 at a point between its contact face with tooth 51 and pin 82 is a lug 85 having a pin 86 passing through its clevised end. Hooked around pin 86 is one end of a tension spring 87, its opposite end hooked to any suitable projection, not shown, from housing 21.

Spring 87 is used to keep lug 85 against a provided stop pin 88 which is pressed into a wall of housing 21 and serves to keep dog 81 in the proper relation with clutch dog 51. It will be evident from a previous description that dog 81 will serve to keep member 49 and lugs 48 from rotating in the direction of arrow 55. Formed in the end of link 84 which is seated in the clevised end of lever 83 is an elongated hole through which a pin 89 extends, said pin being fixed in lever 83. It will be evident that when gear 33, Figs. 8, 10 and 2, receives rotation in the direction of arrow 55, collar 36 and gear 42 will likewise be rotated. It is also evident that when dog 81, Fig. 2, is moved out to the dotted position 90, spring 52 will snap member 49 and lugs 48 in the direction of arrow 55 throwing rollers 47 into a wedged position between the co-acting faces of clutch ring 34 and clutch cam 46. The reverse of this operation will push the rollers 47 into a free or unwedged position. When the clutch has thus been engaged it is obvious that rotation will be imparted to shaft 44, cam 66 and gear 68. Consequently, cam 66 will be brought into contact with roller 78 which, as it rolls up the cam face, will act through member 77 and yoke 38 to disengage the teeth 40 and 41 and momentarily stop the rotation of gear 42. When roller 78 drops off the cam, springs 37 will re-engage the teeth 40 and 41 and gear 42 will resume its rotation. If immediately after the clutch has been tripped, dog 81 is returned to its normal position it will be evident that tooth 51 will come into contact with the dog and disengage the clutch, the shaft 44 having made but one revolution. The functions of this mechanism will be more fully described hereinafter.

Co-acting with gear 68 is another gear 91 in Fig. 9, being fastened by dowels, not shown, to disc 92 and having formed on its opposite face a series of serrations 93 (Figs. 7 and 9) which are held in driving relation to a similarly serrated face on member 94 by a series of screws 95. The opposite end of member 94 is in the shape of a large circular disc having formed on its periphery two teeth 96 (Figs. 9 and 1) opposite each other. Mounted internal of member 94 are bearings 97 on shaft 98, one end of the shaft being fixed in lug 30, a part of housing 21. Adjacent to lug 30 is a shoulder 99 formed on shaft 98 the opposite face of which abuts with a bearing 97. Located between bearings 97 is a spacer 100 which serves as a medium through the use of a standard lock nut 101 to lock the bearings and member 94 in a definite position on the shaft 98. The opposite end of shaft 98 is fixed in a bore of cover plate 72 which covers a hole in housing 21 large enough to permit insertion member 94 and its component parts into the housing. On the periphery of member 92, Fig. 6, are formed two notches 102 exactly opposite each other. Slidably mounted in a boss in housing 21 is a plunger 103 having formed on its outer end a shape suitable to seat itself in notch 102 of member 92. The opposite end of plunger 103 is counterbored to receive one end of a compression spring 104 it being confined within the housing 21 by means of a plate 105 which is fastened to the housing by screws, not shown. It is obvious that in this way plunger 103 will be constantly forced outward. Cut through both members 91 and 92 are two elongated holes to accommodate screws 95, the elongation serving as a means of adjusting the relation between members 91 and 92 with member 94. A second cover plate 106 seals an opening in plate 72 which exposes and allows adjustment of screws 95. It will be evident that, as this adjustment is made, gear 91 and member 92 will maintain their relation to the housing 21 but member 94 and its associated teeth 96 will be rotated as desired. The function of this adjustment will be more fully described hereinafter.

Meshing with gear 42, Figs. 1 and 8, is a gear 107 keyed to a shaft 108, which shaft also carries gear 109, keyed thereon, and a brake drum 110, said shaft having its end mounted for rotation in lugs, not shown, projecting from a plate 111. Meshing with gear 109 is another gear 112, mounted for rotation in the conventional manner on plate 111, which in turn co-acts with a gear 113, Figs. 1 and 4. The brake drum 110, Fig. 11, secured to shaft 108, is surrounded by a brake band 114 having mounted on its inner surface two pieces of brake lining 115 which bear against and produce a braking effect on the brake drum. The brake band 114 is split and provided with lugs 114ª, one being threaded to receive a screw 116, the other being bored to allow the screw to pass therethrough. The head of the screw 116 is seated against a washer 117 in a pocket provided in plate 111, the body of the screw passing through a hole in said plate. A spacer 118 surrounds the screw having one end bearing against washer 117 and the other end abutting with the lug on the brake band 114 through which the screw passes. It will now be evident that when the head of screw 116 is rotated the lugs on the ends of brake band 114 will be brought together increasing the braking effect on the brake drum 110 and shaft 108. The function of this brake will become more evident as this description progresses.

Keyed to shaft 119, Fig. 4 are gear 113 and pinch roll 120, which are locked against a shoulder thereon by a standard lock nut 121 having threaded engagement with shaft 119. Adjacent to the shoulder on shaft 119 is a bearing 122 it being supported in a recess in housing 123 and being retained therein by cap 124 fastened to the housing by screws, not shown. The opposite end of shaft 119 is carried by another bearing 125 which is also supported by housing 123, said housing 123 having a portion extending through a hole in housing 21 and being fastened thereon by screws, not shown. Coacting with gear 113 is another gear 126 which is keyed to a shaft 127 along with another pinch roll 128 both being retained against a shoulder on the shaft by a standard lock nut 129 having threaded engagement with the shaft. The end of shaft 127 adjacent to the shoulder is carried in a bearing 130 which is supported in a bearing box 131 being slidably mounted in ways internal of housing 123. The opposite end of shaft 127 is carried in a bearing 132 which is retained in a bearing box 133 being also slidably mounted in ways internal of housing 123. Screwed into the top of bearing box 131 is a stud 134 extending upward through a hollow screw 135 having threaded engagement with the housing top plate 136 which is fastened to the housing by screws, not shown. Stud 134 extends beyond screw 135 a sufficient distance to permit the insertion of a pin 137 which provides a bearing for lever 138 whose clevised end straddles the end of the stud. Bearing against the opposite end of screw 135 is a washer 139 its opposite face formed to receive one end of a compression spring 140 whose opposite end bears against and exerts a pressure on bearing box 131. The end of lever 138 which bears against the head of screw 135 is formed as a cam face so that when the lever is pushed into the dotted line position 141 it will tend to slightly raise the stud 134 and its associated bearing box 131. Mounted also in the clevised end of lever 138 is a link 142 it being carried by a pin 143 fixed in lever 138. The opposite end of link 142 is mounted on a pin 144 in the clevised end of a lever 145. The lever 145 extends downwardly to straddle and to support a stud similar to 134 and has a cam face similar to that on lever 138. Bearing box 133 is equipped with a stud, screw, washer and spring all having a relation to each other similar to that previously described in connection with bearing box 131. It will now be evident that when screw 135 and its mate are rotated in the proper direction that the springs will increase their pressure on the bearing boxes which in turn will increase the pressure between the pinch rolls 120 and 128. Also, when lever 138 is moved to the dotted line position 141 the bearing boxes 131 and 133 along with the shaft 127 and its component parts will be raised slightly. Obviously when gear 113 is rotated, its associated roll 120, and gear 126, with its associated pinch roll 128, will also receive rotation. The function of the rolls will be described more fully hereinafter.

Mounted for reciprocation in ways in housing 21 is a carriage 146, Figs. 3 and 9, being retained therein by gibs 147, which are fastened to the housing by screws, not shown. Extending downwardly from the carriage through an opening in the housing are two lugs 148 each having fastened to its lower face by screws, not shown, a plate 149. In the center of each lug 148 a portion has been removed to permit the insertion of a compression spring 150 having its lower end abutting with plate 149 and its upper end bearing against a shoulder on pin 151. This pin and spring construction is duplicated in the center of the other lug 148. Extending upward pins 151 pass through bearings in the carriage 146 and terminate in a block 152, Fig. 3, above the carriage. Fastened to one side of the block is a shear blade 153, there being a buttress block 154 juxtaposed to the blade to maintain a true alignment of the shear blades, said block being fastened to the carriage by screws, not shown. Mounted in the carriage 146 in working relation with shear blade 153 is a lower shear blade 155, being retained therein by a bar 156 fastened to the carriage by screws and dowels, not shown. On the upper face of block 152 is formed a cam having a gradual rise on one side and an abrupt fall on the other. Located in interfering relation with cam block 152 is a roller 157 being mounted for rotation on a pin 158 having its ends fixed in the clevised end of a link 159. The opposite end of link 159 is bored to permit insertion of a pin 160 having its ends fixed in a housing 161 which is fastened to housing 21 by screws, not shown. Intermediate the ends of the link 159 is fixed a pin 162 carrying one end of a tension spring 163, its opposite end retained by a pin 164 fixed in housing 161. A lug projecting from link 159 bears against housing 161 serving to maintain a definite normal position for the links. Directly beneath the surface of the carriage 146 is a cavity which extends the full length of the carriage with the exception of a wall at one end. Located in this cavity is a long compression spring 165 having its one end bearing against the wall at the end of the cavity and its other end bearing against a washer 166 beneath the head of a long screw 167, said screw extending through the spring and rear wall and having a threaded engagement with a wall in housing 21 being retained therein by a lock nut 168. Fastened to carriage 146 by screws and dowels, not shown, and in interfering relation with tooth 96 on member 94 is a block 169. It will now be evident that when member 94 is rotated in the direction of arrow 170 tooth 96 will contact block 169 and carriage 146 will be carried forward until the contact is broken whereupon spring 165 will return the carriage to its normal positive position. It also will be noted that as cam block 152 contacts with roller 157 it will be forced downward carrying shear blade 153 with it and compressing springs 150. When the block 152 has passed the center of roller 157 the springs 150 will return the block and the associated shear blade to their normal upward position. When block 152 contacts with roller 157 on the return stroke it will swing the roller around the pin 160 until it leaves contact with the roller whereupon spring 163 will return the link and roller to their original position. The function of this mechanism will be described more fully hereinafter.

Mounted for rocking movement in the side walls of housing 21 is a shaft 171 Fig. 1 having keyed thereon a group of levers 172, 173 and 174. At a short distance from the bifurcated end of lever 174, which extends downward from the shaft 171, is fixed a pin 175 upon which is pivoted one end of a link 84 having, in the other opposite end, an elongated aperture through which is passed a pin 89 fixed in the clevised end of lever 83. At the extreme end of lever 174 is fixed a pin 176 which carries one end of a tension spring 177, its opposite end being retained in a bracket 178 fastened to bed 1 by screws, not shown. Lever 173 which extends upward from shaft 171 has mounted for rotation in its clevised end a roller 179 being located in engaging relation with a lug 148 on carriage 146. Lever 172 has its end bored to permit insertion of a pin which acts as a bearing for a clevis 180 whose legs straddle lever 172. The function of this group of levers will become more evident as this description proceeds.

Threaded into the end of clevis 180 is a rod 181, Fig. 1, extending along the bed of the rolling machine. At any desired location between any of the rolls in the rolling machine is placed a trigger housing 182 Figs. 1 and 5 which carries, for rocking movement, a pin 183 having fastened to its outer end, in the path of movement of the stock 35, a trigger 184. On the opposite end of pin 183 and internal of housing 182 is fastened a lever 185 carrying in its clevised end a fixed pin which serves to retain one end of a tension spring 186 the opposite end of which is held by a pin 187 fixed in housing 182. Fixed in housing 182 is a stop pin 188 against which lever 185 is held in a definite normal position. Formed on the hub and to one side of lever 185 is a contact face against which bears one end of a member 189 it being mounted for rocking movement in the clevised end of lever 190. Extending beyond its pivot point in lever 190 member 189 is formed in such proportions that gravity is employed to keep that end against a stop provided in the clevised end of lever 190. Extending downward lever 190 is clevised at its lower end to receive a projecting lug from clamp 191, it being retained therein by a pin 192 fixed in the lever. Immediately above pin 192 and still in the clevised portion of lever 190 is fixed a pin 193 carrying one end of a short link 194 its opposite end being mounted for rocking movement about a pin 195 which is fixed in housing 182. Rod 181 passes through the clamp 191, it being clamped therein by screws, not shown. It will now be evident that with spring 177 applying a tension to rod 181 in the direction of arrow 196, Fig. 5, that pressure will be brought to bear against the hub of lever 185 by member 189. Likewise it will be obvious that if trigger 184 is moved to the dotted position 197 member 189 and rod 181 will be released. It is also evident that if trigger 184 has returned to its normal position before lever 190 has done so member 189 will merely swing about its pivot until it clears the hub of lever 185 after which it can fall to its normal position. The purpose and operation of this trigger and the associated mechanism is as follows: After the top pinch roll 128, Fig. 4, has been raised by operating lever 138 the stock 35 may be inserted after which the roll 128 may be dropped and the machine is ready to operate. As the machine is started the pinch rolls begin to drive the stock forward in the direction of arrow 18, Fig. 1, until it hits the rolls in the rolling machine which continue to drive it forward to a point where it contacts with trigger 184. Immediately as the trigger is tipped over rod 181 is released which allows the spring 177 to snap link 84 forward pulling the clutch dog 81 out of engagement with the tooth 51 and permitting the shaft 44 and its associated mechanism to rotate in the direction of arrow 55, Fig. 2. As the gear 68, Fig. 8, which in this case has a 1:2 ratio with gear 91, Figs. 6–9, is rotated one revolution, the gear 91 and its component parts will be rotated one half revolution. It will be evident that as member 92 is rotated, plunger 103 will ride up out of one notch 102 and as the half revolution is completed it will fall into the opposite notch 102 locking it and its associated mechanism in a definite normal position. Likewise will carriage 146 be reciprocated, the shear blades be operated and the stock cut off. Mounted in such a manner that immediately as the stock is cut off, cam 66, (Figs. 8, 10 and 12) will come into contact with roller 78 momentarily throwing out of engagement the gear 42 which drives the pinch rolls. Because of the brake, Fig. 11, mounted in the pinch roll gear train, said train will be stopped immediately as the drive is cut off during which time the stock in the pinch rolls and on the entrance side of the shear blades will stand still. As the roller 78 drops off the cam 66 and the gear 42 is again engaged with its driving means the pinch rolls will resume driving the stock 35 in the direction of arrow 18, Fig. 1. During the time the stock in the pinch rolls remained idle, the stock which has been engaged in the rolls of the rolling machine has continued to travel away from the shear until such a time when the pinch rolls resume rotation and the associated stock again begins to travel. It is obvious that pending the resumption of the rotation of the pinch rolls a gap will be created between the cut ends of the stock which will remain therein during the time the pieces of stock are in the rolling machine. It is also evident that the length of this gap can be varied by varying the face of the cam 66 or by varying the pitch of the ratchet teeth 40 and 41, Fig. 10. When spring 177, Fig. 1, has been allowed to retract it is evident that roller 179 will take a position toward the carriage 146 from its normal position where it will remain until the interferring lug 148 comes forward to contact the roller and move it back to its original position. This will reload the spring 177, push back link 84 allowing spring 87 to return clutch dog 81 to its normal position against stop pin 88. It will also push back rod 181 re-setting the trigger and placing the entire mechanism in readiness for another cut-off operation. Should the length of the piece to be cut off be such that the trigger operating end of the stock comes at or near to the line of contact of a pair of rolls in the rolling machine, an adjustment is provided whereby the operation of the trigger may be effected. By making the adjustment as has been described for Figs. 9 and 7 through use of screws 95 it is possible to increase or decrease the normal distance between tooth 96, Fig. 3, and block 169 thereby retarding or advancing the pick up of carriage 146 succeeding the tripping of trigger 184. This will allow the arrangement of the trigger between the rolls the trigger may be engaged readily by the stock. Obviously the rod 181 extends the full length of the rolling machine bed so as to enable the trigger to be placed between any pair of rolls. Should it be desirable to cut off lengths of stock longer than the bed of the rolling machine the trigger could be mounted on any suitable support in engageable relation with the stock at the desired location.

As a variation of this mechanical control as shown in Figs. 1 and 5 I have devised an electrical trigger of the following description. Mounted between any pair of rolls on the rolling machine is a trigger housing 198, Fig. 14, carrying at its lower end, and in interfering relation with the stock, a trigger 199, which is mounted for rocking movement on a pin 200 fixed in the housing. Attached to the trigger 199 is one end of a tension spring 201, its opposite end being fastened to the housing 198 and serving to maintain the trigger in a positive normal position against a stop pin 202 which is fixed in the housing. On the upper end of trigger 199 is formed a tooth 203 against which bears one end of a dog 204, its opposite end being carried in the clevised end of a lever 205 on a pin 206 which is fixed in the lever. The end of dog 204 is so proportioned that gravity is employed to keep the dog in a definite position against a stop in the clevised end of lever 205. The opposite end of lever 205 is carried for rocking movement on a pin 207 which is fixed in the housing 198. Immediately above the clevised end of lever 205 is fixed an eye 208 which carries one end of a tension spring 209, its opposite end being held by another eye 210, fixed in the housing 198, said spring serving to keep the lever 205 in a definite position against a stop pin 211 fixed in the housing. Intermediate the ends of lever 205 is fixed, insulated therefrom, a contact 212 connected with wire 213. Mounted in co-acting relation with contact 212 is another contact 214, it being fixed to a spring blade 215 which is fixed to and insulated from the housing 198. Fastened to this spring blade 215, which is made of a conductive material, is one end of a wire 216. It will now be evident that if trigger 199 is moved to the dotted position 217 that the contacts 212 and 214 will be brought together and if the wires 213 and 216 are each carrying one side of an electrical circuit that an electrical contact will be made completing the circuit. Trigger 199 will continue to swing around its pivot 200 until the tooth 203 leaves contact with dog 204 allowing the spring 209 to return the lever 205 to its original position thereby breaking the contact. When trigger 199 is allowed to return, the spring 201 will carry it back against its stop pin 202, the tooth 203 contacting with and camming the dog 204 up out of the way so that it may seat in its original position, the dog falling back to its normal position. The further purpose of this electrical contact and its associated mechanism will be hereinafter more fully described.

Mounted in the housing 21A, Fig. 13, is a mechanism similar to that described for Fig. 1 containing a dog 81A bearing against tooth 51 and being held therein by the spring 87 against the stop pin 88. Bearing against stop pin 88A is an extension of dog 81A having mounted in its outward end one end of a link 218 being carried therein by a pin fixed to the extension. The opposite end of link 218 is carried by a pin fixed in the outward end of a plunger 219 associated with a solenoid 220. Mounted elsewhere in the housing 21A is a 10 volt transformer 221 and a 10 volt relay 222. It will be evident that when solenoid 220 is electrically actuated that dog 81A will be moved out of contact with the tooth 51 allowing the mechanism to operate and complete a cutting cycle as previously described.

The transformer 221 is connected across main line 223, 224, (Fig. 15). Conductor 225 connects one side of the transformer to coil 226 of relay 222. The circuit through coil 226 is completed through conductor 213, switch 212, 214, conductor 216 to the other side of the transformer. A circuit through the relay contacts is completed from main line conductor through conductor 227, contacts 228 and 229 and the associated relay armature, conductor 230, the coil of solenoid 220, conductor 231 to the other main line conductor 223. It will now be evident that when the transformer 221 is energized and contact made between 212 and 214 that the coil 226 of relay 222 will also be energized causing a contact to be made between 228 and 229. These contacts carrying a greater voltage such as is necessary to operate the solenoid 220 will do so resulting in a downward thrust of plunger 219, eventually allowing the roller clutch to engage thereby setting into operation the mechanism, before described, for cutting the stock to length.

As a variation in the shear design and a means of operating said shear I have developed the following, in which, 232 (Fig. 16) represents a housing containing my mechanism and shown attached to and receiving power from a conventional type of rolling machine such as has been previously described. I wish it understood that although I have shown but one type of rolling machine in this disclosure, my mechanism can be attached to any type of such a machine that may be built. As a means of receiving power from this particular machine I have shown a worm 233 suitably mounted for rotation in a housing 234, said housing being fastened to the first drive housing of the rolling machine by screws, not shown. Meshing with worm 233 is a worm wheel 235 being carried on either hub by bearings 236 which are mounted in the housing 234 and retained therein by caps 237 fastened to the housing with screws, not shown. Carried in either cap 237 is an ordinary type of oil seal to prevent leakage of the gear lubricant. Internal of worm gear 235 is formed a spline to receive a spline shaft 238 having keyed to one end a spur gear 239, it being retained thereon by a nut 240 having threaded engagement with the shaft. Meshing with gear 239 is another gear 241, Fig. 17, being mounted for rotation on a pin 242, said pin acting as a bearing for one end of links 243 located on either side of gear 241. The opposite ends of links 243 are carried by shaft 238. Also mounted on pin 242 are one end each of two links 244 their opposite ends being carried by shaft 245 having keyed thereon, between the links, a gear 246 meshing with gear 241. Links 244 and gear 246 are retained on shaft 245 by means of a nut 247 having threaded engagement with the end of shaft 245. Adjacent to the gear and links on shaft 245 is mounted a bearing 248 it being retained against a shoulder on the shaft by a standard lock nut 249 having threaded engagement with the shaft, the bearing being carried in a bore in housing 232 and retained therein by a cap 250, which contains an ordinary oil seal 251 and is fastened to the housing with screws, not shown. On the opposite end of shaft 245 is keyed a gear 252 being retained thereon by a washer 253 and screw 254 having threaded engagement with the shaft. Adjacent to the gear 252 shaft 245 is carried in a bearing 255 being supported in a housing 256 and retained therein by a cap 257, which contains an ordinary oil seal 258 and is fastened to the housing by screws, not shown. Extending beyond gear 252 housing 256, which is fastened to housing 232 by screws and dowels, not shown, has formed in its outer wall an opening large enough to assemble the gear on its shaft and having arranged over said opening a cover plate 259 fastened to the housing with screws, not shown. Between the bed of the rolling machine 1 and the housing 232 is located a plate 260 it being slidably mounted against the bed by means of a key 261 which is fastened to the bed by screws, not shown. As a means of retaining plate 260 against the bed 1 I have provided some elongated holes 262, Fig. 18, in the plate through which are inserted screws 260 having threaded engagement with the bed. Slidably mounted against plate 260 is housing 232 by means of a key, not shown, at right angles to key 261, said key being fastened to the plate with screws, not shown. Retaining the housing 232 against the plate 260 are screws 264 having threaded engagement with the plate and passing through elongated holes 265 in the housing. It will now be evident that when worm 233 is rotated, worm gear 235 will receive rotation which will be imparted through the gear train 239—241 and 246 to the shaft 245 and its associated gear 252. Also it is obvious that when adjustment is made at screws 263 that rotation will continue through the newly located spline shaft 238, it maintaining its relation with the housing 232. When such adjustment is made the drive through the gears 239, 241 and 246 is maintained, the links 243 and 244 merely opening or closing to permit any variation in distance between shafts 238 and 245. The further purpose of this drive and its associated adjustment will be described more fully hereinafter.

Co-acting with gear 252 is another gear 256, Fig. 24, being keyed to a shaft 267 and retained thereon by a washer 268 and screw 269 having threaded engagement with the shaft. Adjacent to the gear 266 on shaft 267 and bearing against a shoulder on the shaft between itself and the gear is a bearing 270 being supported in the housing 256 and retained therein by a cap 271, which contains an ordinary oil seal 272 and is fastened to the housing with screws, not shown. Abutting with the opposite side of bearing 270 is a spacer 273 having its opposite end bearing against a gear 274 which is keyed and retained on the shaft by a standard lock nut 275 having threaded engagement with the shaft 267. The end of the shaft 267 adjacent to the lock nut 275 is carried in a bearing 276, it being contained in a lug 277 of the housing 232 and retained therein by a cap 278 fastened to the lug with screws, not shown. As has previously been described, housing 256 extending beyond gear 266 has a cover plate 259 sealing a large opening in its outer wall. It is evident that when gear 266 is rotated, gear 274 will also be rotated, the gears being keyed to the same shaft 267. The further purpose of this drive will become more evident as this description progresses.

Figure 25:
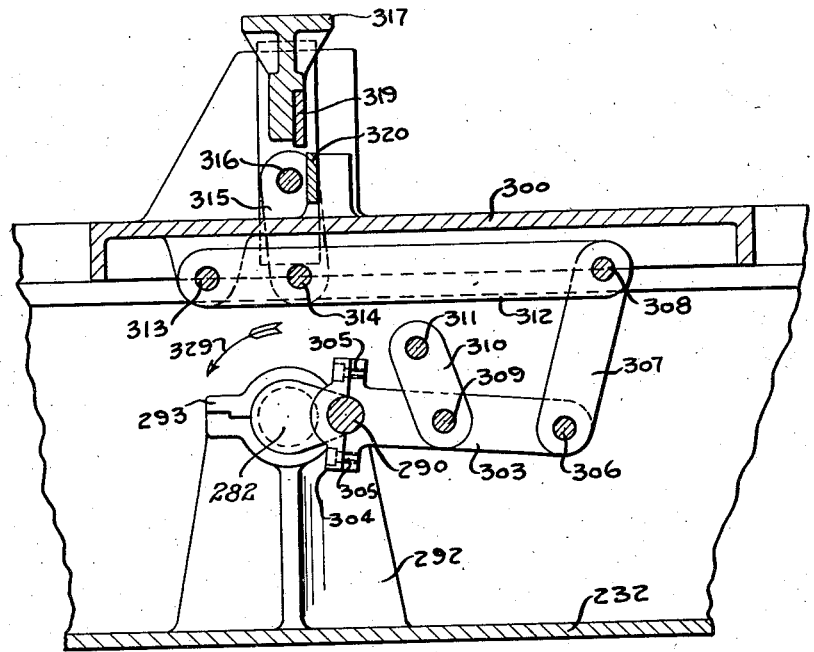
Fig. 25 is a face view of a portion of the operating mechanism with portions removed.

Meshing with gear 274 is a gear 279, Fig. 22, being keyed to a drive member 280 and retained thereon by a plate 281 fastened to member 280 with screws, not shown. Mounted internally of the opposite face of member 280 is a clutch ring and rollers similar to those illustrated in Figs. 2 and 8. Keyed to the crankshaft 282 and in the proper relation to the clutch ring are the other clutch members which have been previously described for Figs. 2 and 8. Adjacent to the clutch cam on shaft 282 is one face of a bearing 283 having in contact with its other face a spacer 284 whose opposite end abuts with another bearing 285. Bearings 283 and 285 have their outer races pressed into a bore in drive member 280 carried for rotation. Abutting with the opposite face of bearing 285 is the extension of the inner race of bearing 286 which is supported in housing 256 and retained therein by a cap 287 fastened to the housing by screws, not shown. Threaded to the end of shaft 282 is a standard lock nut 288 serving as a means of retention for bearings 286, 283, 285, spacer 284 and the clutch members against a shoulder provided on the shaft. Shaft 282 is formed with cranks 289 and 290. Between the cranks 289 and 290 are located bearings 291 being supported by lugs 292 integral with housing 232, the bearings being retained by caps 293 (Figs. 22 and 25) fastened to the lugs with screws, not shown. Mounted for rotation on crank 289 (Figs. 22 and 23) is one end of a lever 294 its opposite end being carried by a pin 295 fixed intermediate the ends of a lever 296. The upper end of lever 296 is mounted for rotation on a pin 297 having its end fixed in clevised lug 298 straddling the lever and extending downward from the shear carriage 300. The lower end of lever 296 is mounted for rocking movement on a pin 299 which is fixed in one end of a link 301, its opposite end being carried by a pin 302 fixed in housing 232. Mounted for rotation on cranks 290 are one end each of two connecting rods 303, Figs. 22 and 25, being retained thereon by caps 304 fastened to the lever with screws 305. The opposite ends of levers 303 are mounted on a pin 306 which is fixed on either end to a pair of links 307 having their opposite ends carried for rocking movement on another pin 308. Intermediate the ends of levers 303 is fixed a pin 309 carrying one end of a link 310 having its opposite end mounted for rotation on a pin 311 being fixed in housing 232. Pin 308 is fixed in one end each of levers 312 having their opposite ends carried for rocking movement on a pin 313 which is fixed to carriage 300. Adjacent to the pin 313 and fixed to levers 312 is another pin 314 which carries one end each of two links 315 having their opposite ends mounted on a pin 316 fastened to a shear slide 317. Mounted in ways provided on the housing 232 is the shear carriage 300 being retained therein for reciprocation by gibs 318 fastened to the housing with screws, not shown. Mounted for reciprocation in ways internal of carriage 300 is a slide 317 having on either side an extension projecting downward to provide suitable bearing surface for the slide. In the upper part of the slide is mounted a shear blade 319 being fastened therein with screws, not shown. Mounted on the carriage 300 and in operating relation with the shear blade 319 is a lower shear blade 320 being fastened to the carriage by screws, not shown. On the shaft 282 adjacent to crank 299 is formed a shoulder against which a member 322 bears, Fig. 22, the member being keyed to the shaft. Abutting with the outer face of member 322 is a spacer 323, its opposite end bearing against the inner race of a bearing 324 which is retained on the shaft by a lock washer 325 having threaded engagement with the shaft. Bearing 324 is supported in a cover plate 326, which seals an opening in housing 232 amply large to facilitate assembly, and is retained therein by a cap 327 fastened to the plate with screws, not shown, said plate being fastened to the housing by screws, not shown. Mounted in operating relation with the clutch is a clutch dog 328, Fig. 23, its function being similar to that described for Fig. 2. It will now be evident that when gear 279 is rotated and the clutch is engaged in a manner as has been heretofore described that the shaft 282 and its associated members will rotate for one revolution. Also it is obvious that as crank 289 is rotated the carriage will be reciprocated and returned to its normal position. Also, as cranks 290 are rotated in the direction of arrow 329 the shear slide 317 with its associated blade 319 will reciprocate during the forward travel of the carriage 300 and remain substantially idle at its normal upward position during the return travel of the carriage. The purpose of this drive and the resulting crank motions will be described more fully hereinafter.

Figure 26:
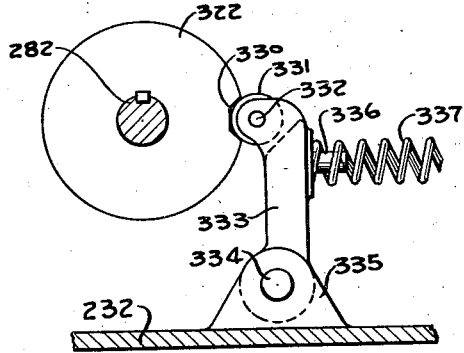
Fig. 26 is a section taken along line 26—26 Fig. 22 with portions omitted.

Formed on the periphery of member 322, Figs. 22 and 26, is a notch 330 into which normally seats a roller 331 being carried for rotation on a pin 332 fixed in the clevised end of a lever 333. The opposite end of lever 333 is mounted for rocking movement on a pin 334 which is fixed in a lug 335 as a part of housing 232. Fixed in the lever 333 intermediate of its ends is a pin 336 serving to pilot one end of a compression spring 337 having its opposite end bearing against a wall of housing 232, not shown. It will be evident that when member 322 is rotated that roller 331 will ride up out of the notch and as the revolution is completed, the spring 337 will push the roller back into the notch thereby confining the shaft 282 to exactly one revolution and maintaining its definite normal position.

Mounted in the housing 232 for rotation and meshing with gear 279, Figs. 22 and 16, is a gear 338, it meshing with another gear 339 which is also mounted in the housing for rotation. Meshing with gear 339 is a gear 340, Figs. 16 and 20, it being keyed to a shaft 341 having its ends mounted for rotation in lugs 342 which extend from a plate 343 sealing a hole in the end of housing 232 and fastened thereon with screws and dowels, not shown. Keyed to shaft 341 at a point intermediate its ends is a member 344 Fig. 21 having formed in its periphery three notches 345 each carrying a roller 346 bearing against a spring 347 which abuts its opposite end against one face of the notch 345. Mounted on either side of member 344 is a plate 348 serving to retain the rollers within the member. Surrounding the member 344 and its associated rollers and springs is a gear 349 being mounted for rotation on its hub in a lug 350 extending from the plate 343. It is evident that when the gear 340 and shaft 341 receive rotation in the direction of arrow 351 that the rollers 346 will engage the gear 349 and rotate it in a similar manner. Obviously gear 349 can be rotated faster than shaft 341 in the direction of arrow 351 without interfering with the speed of the gear 340.

Meshing with gear 349, Fig. 16, is a gear 352 which functions similar to gear 113, Fig. 4, being keyed to a shaft with a pinch roll and meshing with another gear driving its associated pinch roll. The top pinch roll is mounted and adjustable in a manner similar to that described for Fig. 4. The pinch roll housing 353, Fig. 16, being fastened to the housing 232 with screws and dowels, not shown. Mounted for rotation on the entrance side of the pinch roll housing 353 is a pair of guide rolls 354 being carried on pins 355 which are retained in a T slot formed in the housing. Adjacent to the guide rollers is an entrance roller 356 mounted for rotation in the housing 353 and provided to carry the stock to the pinch rolls.

Figure 28:
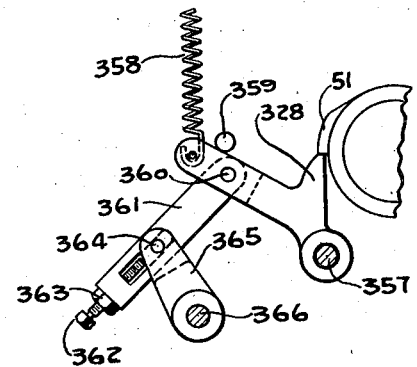
Fig. 28 is a face view of a portion of the mechanism shown in Fig. 23, with sections omitted.

Dog 328, Figs. 23 and 28, previously mentioned, is mounted for rocking movement on a pin 357 fixed in the housing 232 and having a clevised extension projecting from its one side. Fixed in the extreme end of the extension is a pin carrying one end of a tension spring 358 its opposite end suitably anchored to a wall of the housing 232 and serving to keep the dog 328 in a definite normal position against the stop pin 359 which is fixed in the housing. Adjacent the end of the extension on dog 328 is a pin 360 carrying one end of a link 361 having threaded into its opposite end a screw 362 being retained therein with a jam nut 363. Intermediate the ends of link 361 is formed an elongated hole into one end of which extends the end of the screw 362. Passing through the elongated hole between its inner end and the end of the screw 362 is a pin 364 having its ends fixed in either leg of the clevised end of a lever 365 which is mounted at its opposite end with keyed relation to a shaft 366 which is mounted for rotation in housing 232. Also keyed to shaft 366 and extending downward is a lever 367 carrying at its opposite end one end of a coil tension spring 368, it being retained at its opposite end by a pin 369 fixed in the housing 232. Another lever 370, being keyed at one end to shaft 366 and extending outward, carries a pin 371 upon which is mounted for rotation one end of a link 372. Fixed in the opposite end of link 372 is a pin 373 acting as a bearing for one end of a lever 374 having its opposite end keyed to a shaft 375 which is mounted for rocking movement in housing 232. Also keyed to shaft 375 is a lever 377 carrying at its upper end one end of a clevis 376 to which is attached one end of a rod 378 the function of which is similar to rod 181, Figs. 1 and 5. Lever 379, having its one end keyed to shaft 375, carries, in its clevised opposite end, a roller 380 which is arranged in interfering relation with a lug 381 fastened to the forward end of shear carriage 300. It will now be evident that when rod 378 is released in a manner heretofore described that the spring 368 will snap the lever 367 forward bringing pin 364 of lever 365 into contact with the screw 362 causing the dog 328 to move out of contact with the tooth 51 permitting the clutch to engage and rotate its associated shaft similar to the operation described for Figs. 2 and 8. Also it is evident that by adjusting the screw 362, Fig. 28, the time interval between the actual tripping of the trigger and the throwing out of dog 328 can be varied as desired.

A cover plate 382, Fig. 16, serves to seal a hole in the side of housing 232 which is sufficiently large to facilitate assembly of the internal mechanism. I have also shown as a manner of supporting housing 232 a pair of eyebolts 383 threaded into either end of a turnbuckle 384 and having one end fixed to housing 232 and the other to machine bed 1.

When it is desired to operate this mechanism the top pinch roll is raised in a manner previously described and the stock 35 is inserted. After the pinch roll is lowered to grip the stock, the machine is ready to operate. The stock is driven by the pinch rolls in the direction of arrow 385, Fig. 16, on into the rolls of the rolling machine where it contacts with a trigger similar to either of those described for Figs. 5 and 14. Immediately as the trigger is tripped the clutch on shaft 282, Fig. 22, is engaged rotating the shaft one revolution, reciprocating the carriage 300, operating the shear slide 317 and cutting off the stock. During this time the pinch rolls have been driven slightly slower than the speed which the stock engaged in the rolling machine has been pulling them. As the stock is cut-off it will be evident that the stock in the rolling machine will travel slightly faster than the stock in the pinch rolls. A gap will in this way be created and will gradually increase in length until the end of the stock to be cut off is engaged in the form rolls when its speed will be increased and maintained at that of the rest of the stock in the rolling machine. The length of this gap can be varied by changing the gears in the gear train which drives the pinch rolls so as to increase or decrease the speed of the pinch rolls as desired. As a means of varying the speed of the carriage I have provided the change gears 266, Fig. 24 and 252, Fig. 18 which may be changed as desired to increase or decrease the speed of the shaft 282 and the associated mechanism.

After the spring 368, Fig. 23, has been released, the roller 380 will assume a position forward of its normal location. When the carriage 300 comes forward the lug 381 will contact the roller 380 pushing it back to its normal position, resetting the spring 368 and placing the entire trigger mechanism in readiness for another cutting cycle.

Should the condition arise, such as I have previously described, in which the trigger would come in the center of a roll of the rolling machine I have provided the following adjustment. The screw 362, Fig. 28, can be adjusted, as I previously mentioned, to increase or decrease the time interval between the tripping of the trigger and the actual starting of the cut-off cycle. It is therefore evident that this adjustment can be employed to keep the trigger always between the roll pairs of the rolling machine.

Should the adoption of new rolls or some other condition necessitate the varying of the heighth of the shear, the screws 264, Fig. 18 can be loosened and the entire mechanism moved vertically to any desired location, the transmission of power being continued as previously described for Fig. 18. Likewise a horizontal adjustment can be made to compensate for any such necessity.

In Fig. 27 I have shown my mechanism receiving power from a self-contained source, such as a motor 386 being mounted and fastened to the housing 232 with screws, not shown. Connecting the end of the motor shaft and the end of a worm shaft 387 is a flexible coupling 388. Meshing with the worm 387, which is suitably mounted for rotation in a housing 389, is a worm gear 390, said housing being fastened to the housing 232 with screws and dowels, not shown. Worm gear 390 is keyed to a shaft having a function similar to shaft 245, Fig. 18. Mounted internal of housing 232, Fig. 27, is an entire mechanism similar to that described for Fig. 16, with the exception that instead of one pair of pinch rolls I have shown two both being mounted similar to those described for Fig. 4. The entire housing 232 and its associated motor and mechanism being supported on a conventional machine base 391. Fastened to the end of housing 232 with screws, not shown, is a bracket 392 being used to support either type of trigger (Figs. 5 and 14) which I have already described. It will now be evident that when the motor 386 is started and the mechanism put into operation that the stock 35 will trip the trigger and cut-off the stock in a manner heretofor described. I have shown this application merely as a means of portraying the extreme flexibility of my mechanism.

While in this disclosure I have shown only a roller type of clutch, Fig. 2, I wish it understood that any type of clutch whereby a uniform and substantially instant engagement of the driving and driven members can be had could be used. Clutches having a variable time lag between the actual power pick up and the tripping cannot be used on account of the inaccuracy in lengths of cut.

Altho I have illustrated and described my apparatus as designed for cutting off lengths of stock by means of shearing knives or the like it will be seen that punching or embossing dies may be substituted for the shear blades without departing from the spirit of my invention. In some instances it may be desirable to punch holes or emboss a legend at spaced intervals on a moving strip of stock and my apparatus is particularly adapted to perform such operations. It will be understood therefore that the terms used in this specification and the appended claims in reference to the severing means shown and described are intended to also include punching means, embossing means, and the like.

My combination of a cutting, punching or embossing mechanism operable to cut, punch or emboss moving stock without a stopping thereof, with tripping and power pick up means operable to operate substantially consistently and instantly, comprises a mechanism that produces a commercial cutter, that to my knowledge and belief has never before existed. My application of uniform power pick up produces new and useful results, even though a portion of the mechanism involved does consist of old elements. Without using the principle underlying my method of operation, it is impossible to obtain speed, accuracy, etc. in length of cut or spacing of punching or stamping operations. I also wish it understood that although various types of clutches can be used with my mechanism, their use would not involve any departure from my invention.

Also do I wish it known that the particular machine and the different parts thereof illustrated and described are merely a typical embodiment of certain forms of my invention and that the specific construction described herein is merely by way of illustration and not by limitation or narrowing of my claims.

Obviously, various of the features described can be omitted leaving the machine still operative to do certain of its work, such changes being contemplated by me and not involving any departure from my invention.

Having thus described my invention, what I claim as new and desire to secure by Letters Patent is:—

1. A stock cutting mechanism comprising, in combination, means for advancing the stock, trigger means arranged to be engaged by the advacing stock, a clutch detent connected with and releasable by actuation of the trigger, an overrunning clutch arranged to be released by the clutch detent, power means connected with the clutch, cam means arranged to be driven by the clutch when engaged, a carriage movable parallel to and in the direction of movement of the advancing stock, said cam being arranged to engage and move the carriage in unison with the advancing stock, severing means on the carriage, and a second cam means for actuating the severing means during movement of the carriage in unison with the stock.

2. A stock cutting mechanism comprising, in combination, means for advancing the stock, trigger means arranged to be engaged by the advancing stock, a clutch detent connected with and releasable by actuation of the trigger, an overrunning clutch arranged to be released by the clutch detent, power means connected with the clutch, cam means arranged to be driven by the clutch when engaged, a carriage movable parallel to and in the direction of movement of the advancing stock, said cam being arranged to engage and move the carriage in unison with the advancing stock, severing means on the carriage, independent cam means for actuating the severing means during movement of the carriage in unison with the stock, and means for setting the first named cam in an initial position.

3. A stock cutting mechanism comprising, in combination, means for advancing the stock, trigger means arranged to be engaged by the advancing stock, a clutch detent connected with and releasable by actuation of the trigger, an overrunning clutch arranged to be released by the clutch detent, power means connected with the clutch, cam means arranged to be driven by the clutch when engaged, a carriage movable parallel to and in the direction of movement of the advancing stock, said cam being arranged to engage and move the carriage in unison with the advancing stock, severing means on the carriage, independent cam means for actuating the severing means during movement of the carriage in unison with the stock, means for setting the first named cam in an initial position, and means for adjusting the first named cam relative to the last mentioned means.

4. A stock cutting mechanism comprising, in combination, means for advancing the stock, trigger means arranged to be engaged by the advancing stock, a clutch detent connected with and releasable by actuation of the trigger, an overrunning clutch arranged to be released by the clutch detent, power means connected with the clutch, cam means arranged to be driven by the clutch when engaged, a carriage movable parallel to and in the direction of movement of the advancing stock, said cam being arranged to engage and move the carriage in unison with the advancing stock, severing means on the carriage, independent cam means for actuating the severing means during movement of the carriage in unison with the stock, and means associated with the first mentioned cam for momentarily retarding the operation of the stock advancing means incident to the operation of the severing means.

5. A stock cutting mechanism comprising, in combination, means for advancing the stock, trigger means arranged to be engaged by the advancing stock, a clutch detent connected with and releasable by actuation of the trigger, an overrunning clutch arranged to be released by the clutch detent, power means connected with the clutch, cam means arranged to be driven by the clutch when engaged, a carriage movable parallel to and in the direction of movement of the advancing stock, said cam being arranged to engage and move the carriage in unison with the advancing stock, severing means on the carriage, independent cam means for actuating the severing means during movement of the carriage in unison with the stock, and means associated with the several foregoing elements for severally restoring said elements to initial positions.

6. A stock cutting mechanism comprising, in combination, means for advancing the stock, a trigger arranged to be engaged by the advancing stock, a clutch detent connected with and releasable by actuation of the trigger, a clutch arranged to be released by the detent, power means connected with the clutch, a cam arranged to be driven by the clutch when engaged, a carriage moveable parallel to and in the direction of movement of the advancing stock, the cam being adapted to move the carriage in unison with the advancing stock, a shear on the carriage, an independent cam for actuating the shear during movement of the carriage in unison with the moving stock, and means for setting the cams in an initial position.

7. A cut-off machine comprising, in combination, a support, a carriage slidably mounted on the support, a bottom shear blade fixed to the carriage, a top shear blade mounted for vertical reciprocation on the carriage, a crankshaft having a pair of cranks rotably mounted within the support, a link pivotally hung from the carriage, a second link pivoted to the end of the first mentioned link, a lug in the support pivotally supporting the opposite end of the second named link, a connecting rod connecting one of the cranks on the crankshaft to the first named link, a third link pivotally hung from the top shear blade, a beam pivotally supported by the carriage and having pivoted connection intermediate its ends with the end of the said third link, a fourth link pivotally hung from the opposite end of the beam, a connecting rod connecting the other crank on the crankshaft to the end of the fourth named link, a lever pivotally fixed intermediate the ends of the connecting rod it's opposite end being pivotally fixed in the support, a driving member, a clutch on the crankshaft to engage the driving member to the crank shaft, and a trigger to effect the engagement of the clutch.

8. In a stock cutting mechanism, a carriage, a pair of relatively movable cutting blades carried by the carriage, a crankshaft having a plurality of crankarms formed therein, a linkage connected to one of said crankarms and to one of said cutting blades to effect the vertical reciprocation thereof, linkage between another of said crankarms and said carriage to effect the reciprocation of the carriage, said second named linkage comprising a pair of levers pivotally connected to said crankarm and to each other in lever arm ratio to effect a substantially uniform rate of travel of the carriage throughout the reciprocative translation of the carriage in the direction of travel of the stock, the said crankarms being positioned on said crankshaft relative to their respective dead center points so that the severing movement of said cutting blade will be effected subsequent the movement of the carriage in its said reciprocative cycle of substantially uniform movement.

NORBERT RUBIN.